(12) United States Patent
Shinozaki et al.

(10) Patent No.: US 7,159,087 B2
(45) Date of Patent: Jan. 2, 2007

(54) STORAGE SYSTEM AND REMOTE COPY METHOD FOR STORAGE SYSTEM

(75) Inventors: Toshihiko Shinozaki, Odawara (JP); Eiichi Sato, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 262 days.

(21) Appl. No.: 10/853,277

(22) Filed: May 26, 2004

(65) Prior Publication Data
US 2005/0216682 A1 Sep. 29, 2005

(30) Foreign Application Priority Data
Mar. 23, 2004 (JP) .............................. 2004-083923

(51) Int. Cl.
*G06F 12/00* (2006.01)

(52) U.S. Cl. ...................... 711/162; 709/217
(58) Field of Classification Search ..................... None
See application file for complete search history.

(56) References Cited

U.S. PATENT DOCUMENTS

| 5,603,024 | A | 2/1997 | Goldring |
| 6,510,500 | B1 | 1/2003 | Sarkar |
| 6,910,112 | B1 | 6/2005 | Berkowitz et al. |
| 2003/0126107 | A1* | 7/2003 | Yamagami ...................... 707/1 |
| 2004/0098547 | A1* | 5/2004 | Ofek et al. ................. 711/162 |
| 2004/0139128 | A1* | 7/2004 | Becker et al. .............. 707/204 |
| 2004/0267836 | A1 | 12/2004 | Armangau et al. |
| 2005/0027819 | A1 | 2/2005 | Nakano et al. |

FOREIGN PATENT DOCUMENTS

| JP | 278819 | 9/2002 |
| JP | 2003-233518 | 8/2003 |

* cited by examiner

*Primary Examiner*—Brian R. Peugh
*Assistant Examiner*—Jared Rutz
(74) *Attorney, Agent, or Firm*—Mattingly, Stanger, Malur & Brundidge, P.C.

(57) ABSTRACT

This invention provides a secondary disk array device with functions for data management of a plurality of generations. The disk array device 1 of a primary site comprises remote copy functions. When updating of a primary volume 4 is performed by a host 3, differential data 5 occurs. The disk array device 1 performs remote-copying of the differential data 5 and difference management information to the disk array device 2 of a secondary site. The disk array device 2 receives the remote-copied data via a virtual secondary site 6. The differential data and similar is demarcated into generations, and is stored in a generation management volume 7. A secondary volume 8 stores the storage contents of the primary volume 4 at a prescribed point in time. By this means, remote copy functions can be used for data management of a plurality of generations within the disk array device 2. Generation management functions can be added to the system without interrupting operation of the primary disk array device 1, and without modification of specifications.

6 Claims, 13 Drawing Sheets

Fig.5

| DIFFERENCE MANAGEMENT INFORMATION | | ~103 |
|---|---|---|
| I/O 1 | UPDATE POSITION IN PRIMARY VOLUME | |
| | UPDATE SIZE | |
| | UPDATE DATE AND TIME | |
| I/O 2 | UPDATE POSITION IN PRIMARY VOLUME | |
| | UPDATE SIZE | |
| | UPDATE DATE AND TIME | |
| I/O 3 | UPDATE POSITION IN PRIMARY VOLUME | |
| | UPDATE SIZE | |
| | UPDATE DATE AND TIME | |
| ⋮ | ⋮ | |
| I/O n | UPDATE POSITION IN PRIMARY VOLUME | |
| | UPDATE SIZE | |
| | UPDATE DATE AND TIME | |

Fig.7(a)

| DISK ARRAY DEVICE NAME | IP ADDRESS, SUBNET MASK | SERVICE IP ADDRESS, SUBNET MASK | CAPACITY | FUNCTIONS |
|---|---|---|---|---|
| MCU | 192. 168. 10. 1<br>255. 255. 255. 0 | 192. 168. 10. 11<br>255. 255. 255. 0 | DRIVE 1 (72 GB) | DIFFERENTIAL TRANSFER FUNCTION |
| RCU | 192. 168. 10. 2<br>255. 255. 255. 0 | 192. 168. 10. 12<br>255. 255. 255. 0 | DRIVE 2 (72 GB)<br>DRIVE 3 (144 GB)<br>DRIVE 4 (72 GB) | UPDATE DIFFERENCE MANAGEMENT FUNCTION GENERATION RESTORATION FUNCTION |

STORAGE SYSTEM CONFIGURATION INFORMATION T1

Fig.7(b)

| HOST NAME | IP ADDRESS, SUBNET MASK | ADMINISTRATOR | MOUNTED VOLUME, MOUNTED POSITION |
|---|---|---|---|
| HOST 1 | 192. 168. 10. 101<br>255. 255. 255. 0 | Admin 1 | MCU: DRIVE 1,<br>/mnt1 |
| HOST 2 | 192. 168. 10. 102<br>255. 255. 255. 0 | Admin 2 | MCU: DRIVE 1,<br>/mnt2 |

HOST CONFIGURATION INFORMATION T2

Fig.8(a)

| VOLUME COPY CONFIGURATION INFORMATION | |
|---|---|
| COPY SOURCE VOLUME | COPY TARGET VOLUME |
| MCU: DRIVE 1 | RCU: DRIVE 2 |

| GENERATION MANAGEMENT CONFIGURATION INFORMATION | | | | |
|---|---|---|---|---|
| GENERATION SWITCHING CONDITIONS | MAXIMUM NUMBER OF GENERATIONS MANAGED | VOLUMES FOR GENERATION MANAGEMENT | GENERATION MANAGEMENT VOLUME | RECOVERY VOLUME |
| PERIOD SETTING / UPDATE DIFFERENCE CAPACITY SETTING | THREE GENERATIONS | DRIVE 2 | DRIVE 3 | DRIVE 4 |

T4

STORAGE SYSTEM AND REMOTE COPY METHOD FOR STORAGE SYSTEM

CROSS-REFERENCE TO RELATED APPLICATIONS

This application relates to and claims priority from Japanese Patent Application No. 2004-83923 filed on Mar. 23, 2004, the entire disclosure of which is incorporated herein by reference.

BACKGROUND OF THE INVENTION

Field of the Invention

This invention relates to a storage system and a copy method for a storage system enabling synchronization of a primary volume and secondary volume through the transmission and reception of information relating to the difference between a primary storage device and a secondary storage device, as for example in a disk array system.

For example, diverse data is managed in large amounts in various organizations such as enterprises, municipalities, schools and similar. These large amounts of data are managed by a storage system which is created separately from host computers. A storage system comprises at least one storage device such as a disk array system.

A disk array system is configured with for example hard disk drives, semiconductor memory devices, and other storage devices arranged in an array. A disk array system provides storage areas based on a RAID (Redundant Array of Independent Inexpensive Disks).

In a storage system, by managing the storage contents of the main volume separately from the main volume, provisions are made for cases in which main volume data is lost. For example, as one method of data management, by copying the entirety of the storage contents of the main volume to a secondary volume, the volume contents can be stored at a prescribed point in time. As another method, only the update history of the main volume is managed separately in a differential file or similar, and by reflecting the contents of the differential file in sequence in the main volume, the data at a prescribed point in time can be restored (see Japanese Patent Laid-open No. 2002-278819).

Further, in a storage system a plurality of physically remote sites may be connected by communication lines, to provide for the occurrence of earthquakes and other disasters. By performing so-called remote copying, volumes provided at different sites are synchronized (see Japanese Patent Laid-open No. 2003-233518). Remote copying is the creation of multiple copies (mirroring) of a volume, executed spanning system enclosures; synchronization is performed by transmitting on the differences between volumes.

In remote copying, a primary site and a secondary site are synchronized, and the most recent storage contents can be mirrored. However, in remote copying it is not possible to manage storage contents spanning multiple generations.

For example, through difference management of the update history of a volume of a primary site, data management can be performed for a plurality of generations at the primary site. However, at a secondary site there exists only a secondary volume synchronized with the main volume. Hence at the secondary site, recovery of only one generation's worth of data is possible.

There is also a method of providing a plurality of secondary volumes at a secondary site, and switching the secondary volume used for each generation. However, in this case it is necessary to prepare a number of secondary volumes, having a capacity equal to or greater than the main volume, equal to the number of generations to be managed, so that costs are increased. Each time switching between generations occurs, initial copy processing in which the entire storage contents of the volume are copied becomes necessary, so that the processing load is heavy and efficiency declines.

SUMMARY OF THE INVENTION

This invention was devised in light of the above problems, and has as an object the provision of a storage system, and remote copy method for a storage system, enabling data management of a plurality of generations in a secondary storage device. An object of this invention is the provision of a storage system, and remote copy method for a storage system, enabling data management of a plurality of generations on the side of a secondary storage device, using a differential transfer function comprised by the primary storage device. An object of this invention is the provision of a storage system, and remote copy method for a storage system, enabling subsequent addition to a secondary storage device of a function for data management of a plurality of generations in a state in which the primary storage device continues operation, even when the primary storage device does not comprise functions for data management of a plurality of generations.

In order to resolve the above problems, a storage system of this invention performs data management of a plurality of generations in a secondary storage device, by utilizing differential transfer functions (remote copy functions) comprised by the primary storage device, without any alterations on the side of the primary storage device.

A storage system of this invention is a storage system in which a primary storage device having a primary volume is connected to a secondary storage device having a secondary volume, and in which by transmitting difference-related information relating to the differences between the primary volume and secondary volume from the primary storage device to the secondary storage device, synchronization of the primary volume and secondary volume is possible. The secondary storage device comprises a differential transfer accommodation portion, which receives difference-related information from the primary storage device; a generation management portion, which creates generation management information based on difference-related information received via the differential transfer accommodation portion; a generation management volume, which stores the created generation management information; and a generation restoration portion, which restores the storage contents of a specified generation, based on the secondary volume and the generation management volume.

The primary storage device and secondary storage device can each be configured as, for example, disk array devices. The configurations of the two may be different. The primary storage device has a function for transmission to the secondary storage device of updates to the primary volume, as difference-related information. Difference-related information can comprise differential data, which is update data itself, as well as difference management information which is management information for the differential data. Difference management information comprises, for example, the position (block address) of updated data, the update size, and the update date.

In conventional remote copying, the secondary volume of the secondary storage device is updated based on difference-related information from the primary storage device, and is synchronized with the primary volume. In this invention, processing to receive difference-related information is performed by the differential transfer accommodation portion, but in addition to this, the difference-related information is utilized effectively in data management of a plurality of generations.

That is, in generation management the difference-related information is used to create generation management information. For example, the generation management portion creates generation management information based on difference-related information, and associates this generation management information with a storage address for differential data. The generation management information and the differential data which is actual data may be stored separately in a configuration which associates the two, or the differential data may be comprised within the generation management information. The generation management information is stored in a generation management volume prepared separately from the secondary volume.

The storage contents of the primary volume at a prescribed point in time can be stored in the secondary volume. When the contents of the primary volume and the secondary volume no longer coincide due to updates performed subsequent to the prescribed point in time, difference-related information relating to the difference is transmitted from the primary storage device to the secondary storage device. The generation management portion creates generation management information based on the difference-related information, and stores the result in the generation management volume. Hence the generation restoration portion can, by reflecting the generation management information stored in the generation management volume in the contents of the secondary volume, restore data for a specified generation.

The generation management portion restores the storage contents of a specified generation to a virtual secondary volume, rather than to a secondary volume. A virtual secondary volume is a volume which behaves as if it were a secondary volume. A virtual secondary volume can be configured using an actual volume, or can be configured using a table or similar. When using an actual volume to form a virtual secondary volume, the data group forming the storage contents of a specified generation is stored in prescribed positions on the actual volume. When using a table to form a virtual volume, for example, a table is used which replaces data stored at certain addresses on a secondary volume with differential data indicated by the generation management information.

When the storage contents of a secondary volume are themselves replaced with the storage contents of a specified generation, restoration of the storage contents of a generation preceding the specified generation is not possible. On the other hand, by restoring the storage contents of a specified generation to a virtual secondary volume, it is possible to return to a previous generation even after restoration of the storage contents of a given generation.

The generation management portion can set a generation for storage of generation management information based on generation switching conditions, set in advance. Generation switching conditions may be, for example, time-related conditions, capacity-related conditions, or similar. Time-related conditions may be, for example, the lapse of a prescribed length of time, such as every 24 hours or every 48 hours, or may be the occurrence of a prescribed day and time, such as every day at noon. Capacity-related conditions may be, for example, generation-switching at a certain received amount of differential data (generation data amount), such as for example when 40 MB of differential data accumulates. In addition, a prescribed number of times differential data is received, for example, may be employed as a generation-switching condition. In this way, switching of the number of generations managed is performed automatically in the secondary storage device based on generation-switching conditions set in advance.

A secondary volume on a secondary storage device can be configured from a plurality of volumes. These volumes may all be provided within the secondary storage device, or all may be provided outside the secondary storage device. Or, a portion of the volumes constituting the secondary volume may be provided within the secondary storage device, and the other volumes provided outside the secondary storage device. Here, an external volume is a volume on another storage device formed separately from the secondary storage device.

This invention can be realized as a computer program which implements prescribed functions (differential transfer accommodation functions, generation management functions, generation restoration functions) on a secondary storage device. This program can for example be distributed on hard disk devices, semiconductor memory devices, and various other storage media. In addition, this program can also be distributed via a communication network.

Further objects of this invention will be clear from the following descriptions of aspects.

BRIEF DESCRIPTION OF THE DRAWINGS

FIG. 5 is a drawing to explain difference management information;

FIG. 7 is a drawing to explain (a) storage system configuration information and (b) host configuration information;

FIG. 8 is a drawing to explain (a) volume copy configuration information and (b) settings of the generation management configuration;

DESCRIPTION OF THE PREFERRED EMBODIMENTS

Figure 1:
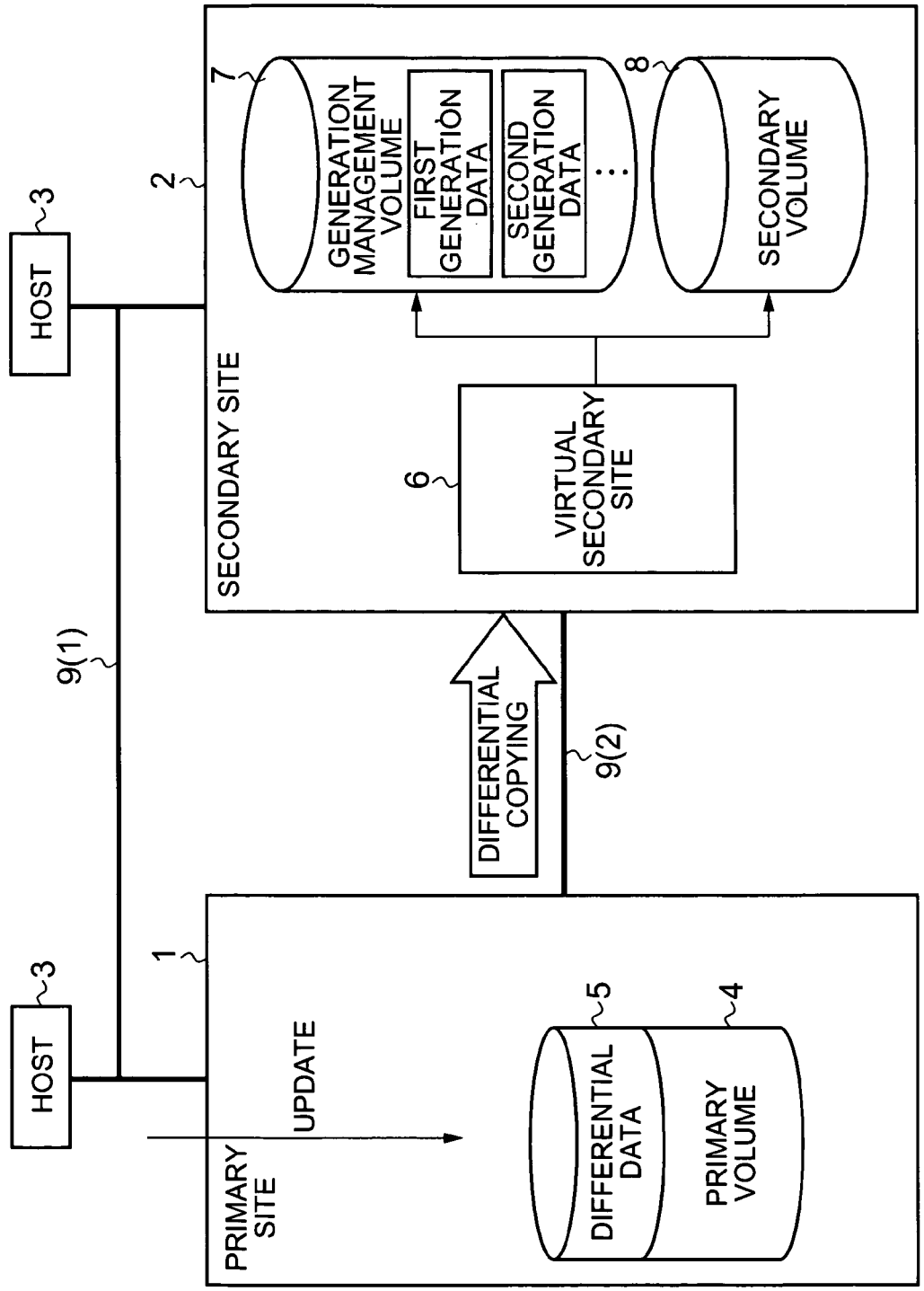
FIG. 1 is a drawing to explain the overall concept of an aspect of this invention.

Below, aspects of this invention are explained based on the drawings. FIG. 1 is a drawing to explain the overall concept of the first aspect. This storage system comprises a primary site 1 having a disk array device, and a secondary site 2 having another disk array device. Details of the disk array devices are here omitted, but the principal volumes thereof and similar are shown. The primary site 1 stores a data group used by an active server (host computer). The secondary site 2 is used for example as a backup for the primary site.

For example, a host computer 3 configured as a server can access each of the sites 1 and 2. By establishing access control, a configuration is possible in which only a specific host computer can access a specific site. The host computer 3 and the sites 1 and 2 are connected by a communication network 9(1). The sites 1 and 2 are also connected by a separate communication network 9(2).

The primary site 1 comprises a primary volume 4. The secondary site 2 comprises a secondary volume 8 which forms a pair with the primary volume 4. The host computer 3 can access the primary volume 4 and perform data writing and reading. When, after a prescribed point in time at which the storage contents of the primary volume 4 and secondary volume 8 are synchronized, data stored in the primary volume 4 is updated, the storage contents of the primary volume 4 and the storage contents of the secondary volume 8 differ only by this updated differential data 5.

The primary site 1 transmits differential data 5 to the secondary site 2. For example, updated data itself and update positions and similar are transmitted from the primary site 1 to the secondary site 2. A function for transfer of differential data 5 spanning enclosures is, in this Specification, called remote copying.

A virtual secondary site 6 is provided in the secondary site 2. The virtual secondary site 6 is, as seen from the primary site 1, a destination for remote copying, having functions for accommodation of remote copying. The primary site 1 executes remote copying with the virtual secondary site 6. The virtual secondary site 6 receives the differential data and similar transmitted from the primary site 1, and returns the required response.

The virtual secondary site 6 creates data for each generation based on the received differential data and stores this in the generation management volume 7. Data for each generation is configured comprising generation management information used to manage this differential data. Generation management information comprises, for example, update positions, update sizes, update dates and times, and storage addresses for differential data. Nearly all the information comprised by the generation management information can be obtained from differential data received from the primary site 1 and from difference management information.

In this Specification a remote copy method for a storage system is disclosed, which is a remote copy method in which, in the storage system of this aspect, by transmitting difference-related information relating to the difference between the primary volume and secondary volume from the primary storage device having the primary volume to the secondary storage device having the secondary volume, the primary volume and the secondary volume are synchronized, and wherein the remote copy method comprises an initial copying step of transmitting from the primary storage device to the secondary storage device the storage contents of the primary volume at a prescribed point in time, and causing these storage contents to be stored in the secondary volume; a differential copying step, when after the completion of initial copying an update is requested of the primary volume, of transmitting differential data and difference management information to the secondary storage device; a generation management step of creating generation management information based on difference management information received from the primary storage device and storing this generation management information in association with differential data in a generation management volume; a restoration step of restoring the storage contents of a specified generation based on the secondary volume and generation management volume; and, a primary volume recovery step of transmitting the restored storage contents from the secondary storage device to the primary storage device and updating the primary volume.

By this means, even when a primary storage device comprises data management functions for a plurality of generations, when the primary storage device comprises remote copy functions, it is possible to subsequently add data management functions for a plurality of generations to a secondary storage device with the primary storage device remaining in a state of operation.

1. First Embodiment

First, an example of a disk array device is explained as the "storage device" provided in both the primary site and the secondary site; then, the configuration specific to this invention is explained. The disk array device of the primary site and the disk array device of the secondary site may have different configurations.

Figure 2:
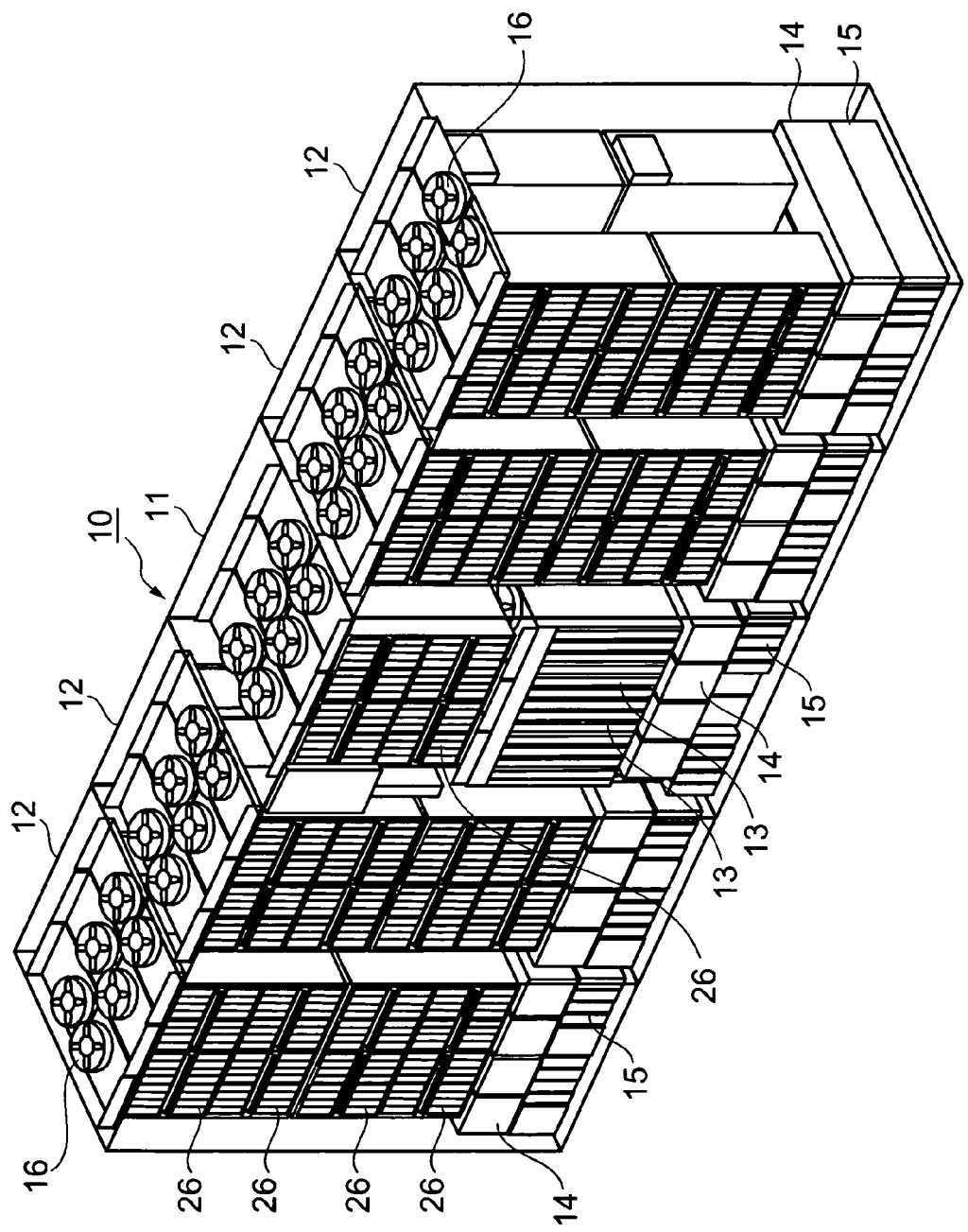
FIG. 2 is an external view of a disk array system which can be used to implement this invention.

FIG. 2 is a summary perspective view showing the external appearance and configuration of a disk array device 10. The disk array device 10 can for example comprise a base enclosure 11 and a plurality of expansion enclosures 12.

The base enclosure 11 is the minimum component unit of the disk array device 10, and comprises both storage functions and control functions. Expansion enclosures 12 are options for the disk array device 10, and are controlled by the control functions of the base enclosure 11. For example, up to a maximum of four expansion enclosures 12 can be connected to a base enclosure 11.

A plurality of control packages 13, a plurality of power supply units 14, a plurality of battery units 15, and a plurality of disk drives 26 are attachably and detachably provided in the base enclosure 11. A plurality of disk drives 26, a plurality of power supply units 14, and a plurality of battery units 15 are attachably and detachably provided in expansion enclosures 12. A plurality of cooling fans 16 are also provided in the base enclosure 11 and in each expansion enclosure 12.

A control package 13 is a module for realizing a channel adapter (hereafter CHA) 21, disk adapter (hereafter DKA) 22, and cache memory 23 and similar, described below. That is, a plurality of CHA packages, a plurality of DKA packages, and one or more memory packages are attachably and detachably provided in a base enclosure 11, and can be exchanged in package units.

Figure 3:
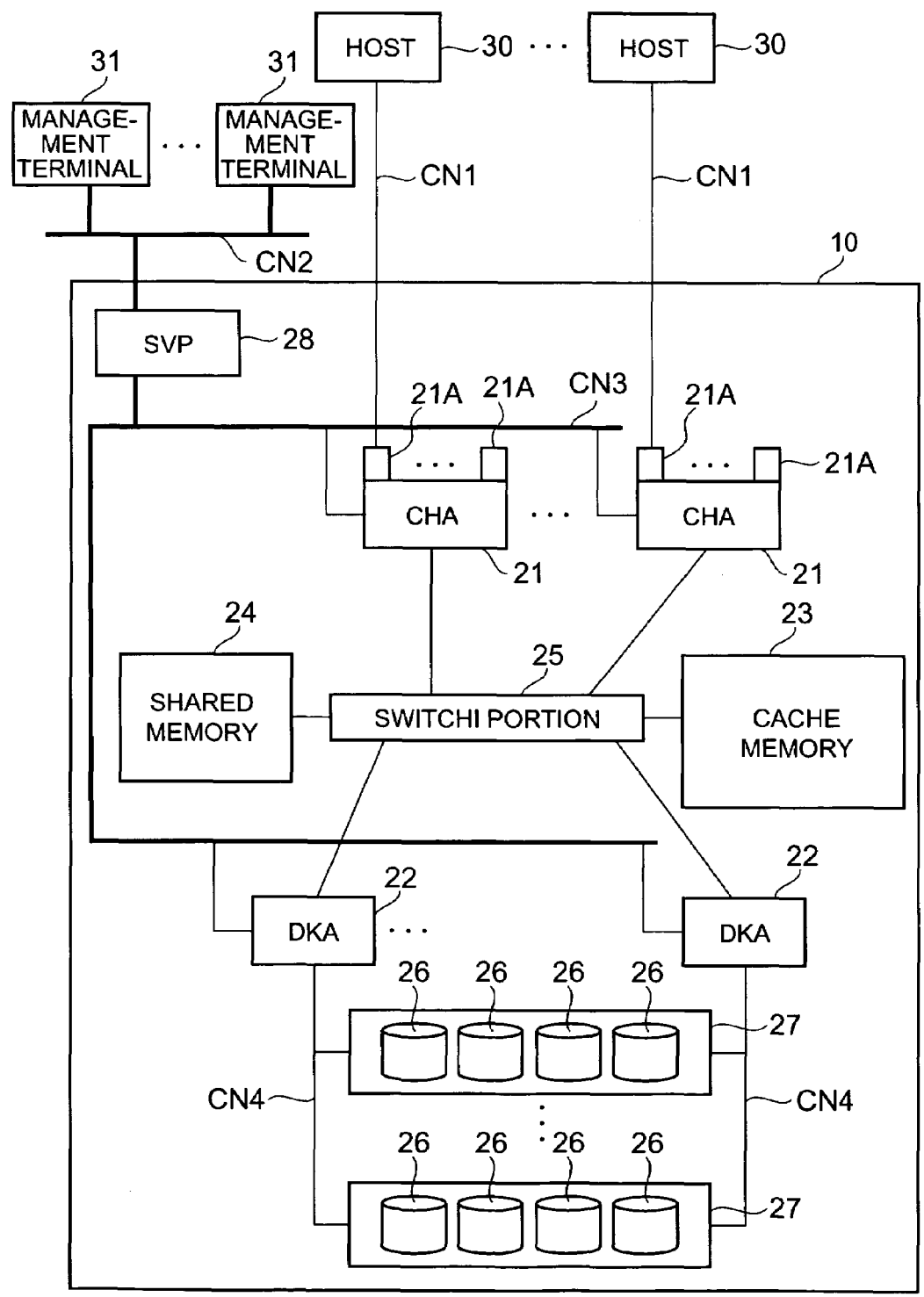
FIG. 3 is a block diagram showing an example of the configuration of a disk array system.

FIG. 3 is a block diagram showing in summary the entirety of a disk array device 10. The disk array device 10 can be connected, in a manner enabling bidirectional communication, to a plurality of host computers 30 via a communication network CN1.

The communication network CN1 is, for example, a LAN (Local Area Network), SAN (Storage Area Network), the Internet, or dedicated circuits. In the case of a LAN, data transfers between a host computer 30 and the disk array device 10 conform to TCP/IP. When using a SAN, data transfers between a host computer 30 and the disk array device 10 conform to the fiber channel protocol.

In cases where the host computer 30 is a mainframe, data transfers are performed using a communication protocol such as FICON (Fibre Connection, a registered trademark), ESCON (Enterprise System Connection, a registered trademark), FIBARC (Fibre Connection Architecture, a registered trademark), or similar.

Each host computer 30 is realized as, for example, a server, personal computer, workstation, mainframe, or similar. For example, each host computer 30 is connected to a plurality of client terminals, positioned outside the drawing, via a separate communication network. Each host computer 30 provides services to the client terminals by reading data from and writing data to the disk array device 10 according to requests from the client terminals.

Each CHA 21 controls data transfer with a host computer 30, and comprises communication ports 21A. For example, 32 CHA package 21 can be provided in a disk array device 10. CHA packages 21 are prepared according to the type of host computer 30, including for example open-system CHA packages, mainframe CHA packages, and similar.

Each CHA package 21 receives commands and data requesting the reading and writing of data from the host connector to which the CHA package is connected, and operates according to commands received from the host computer 30.

To explain operation including operation of DKAs 22, when a CHA 21 receives a read command from the host computer 30, the read command is stored in shared memory 24. The DKA 22 references the shared memory as necessary, and upon discovering an unprocessed read command, reads data from a disk drive 26 and stores the data in cache memory 23. The CHA 21 reads the data which has been moved to cache memory 23, and transmits the data to the host computer 30.

On the other hand, upon receiving a write command from the host computer 30, the CHA 21 stores the write command in shared memory 24, and stores the received data (user data) in cache memory 23. After storing the data in cache memory 23, the CHA 21 reports to the host computer 30 that writing has been completed. The DKA 22 reads the data stored in cache memory 23 and stores the data in a prescribed disk drive 26, according to the write command stored in shared memory 24.

A plurality of DKAs 22, such as for example four or eight, can be provided within the disk array device 10. Each DKA 22 controls data communications with the disk drives 26. DKAs 22 and disk drives 26 are connected via for example a SAN or other communication network CN4, to perform data transfer in block units according to the fiber channel protocol. Each DKA 22 monitors the states of disk drives 26 as necessary, and the monitoring results are transmitted to the SVP 28 via the internal network CN3.

Each CHA 21 and DKA 22 comprises, for example, a printed circuit board on which are mounted processors, memory and similar, as well as a control program stored in memory (none of these appear in the drawing); through the concerted operation of this hardware and software, each realizes prescribed functions.

The cache memory 23 stores user data and similar. The cache memory 23 comprises, for example, nonvolatile memory.

The shared memory (or control memory) 24 comprises, for example, nonvolatile memory. Control information, management information and similar are for example stored in shared memory 24. The configuration information T1, T2 described below can also be managed in shared memory 24. This control information and similar can be managed redundantly in a plurality of units of shared memory 24. The shared memory 24 and cache memory 23 can each be provided in a plurality of units. Further, cache memory 23 and shared memory 24 can be mounted together on the same memory board. Or, a portion of a memory unit can be used as a cache area, and another portion as a control area.

The switch portion 25 connects the CHA packages 21, the DKAs 22, cache memory 23, and shared memory 24. By this means, each of the CHA packages 21 and DKAs 22 can access cache memory 23 and shared memory 24. The switch portion 25 can be configured, for example, as an ultra-high speed crossbar switch.

Numerous disk drives 26 can be installed in the disk array device 10. Each disk drive 26 can for example be realized as a hard disk drive (HDD), as a semiconductor memory device, or similar.

Disk drives 26 are physical storage devices. While there are differences depending on the RAID configuration, for example, a RAID group 27, which is a virtual logical area, may be constructed in the physical storage area provided by a set of four disk drives 26. Further, one or more virtual logical devices (LUs, logical units) can be configured in a RAID group 27.

The storage resources used by a disk array device 10 need not all be provided within the disk array device 10. The disk array device 10 can also use storage resources existing outside the disk array device 10 as if they were storage resources of the disk array device itself.

The service processor (SVP) 28 is connected to each of the CHA packages 21 and DKAs 22 via a LAN or other internal network CN3. Further, the SVP 28 can also be connected to a plurality of management terminals 31 via a LAN or other communication network CN2. The SVP 28 collects information on various states within the disk array device 10 and provides these to management terminals 31.

Figure 4:
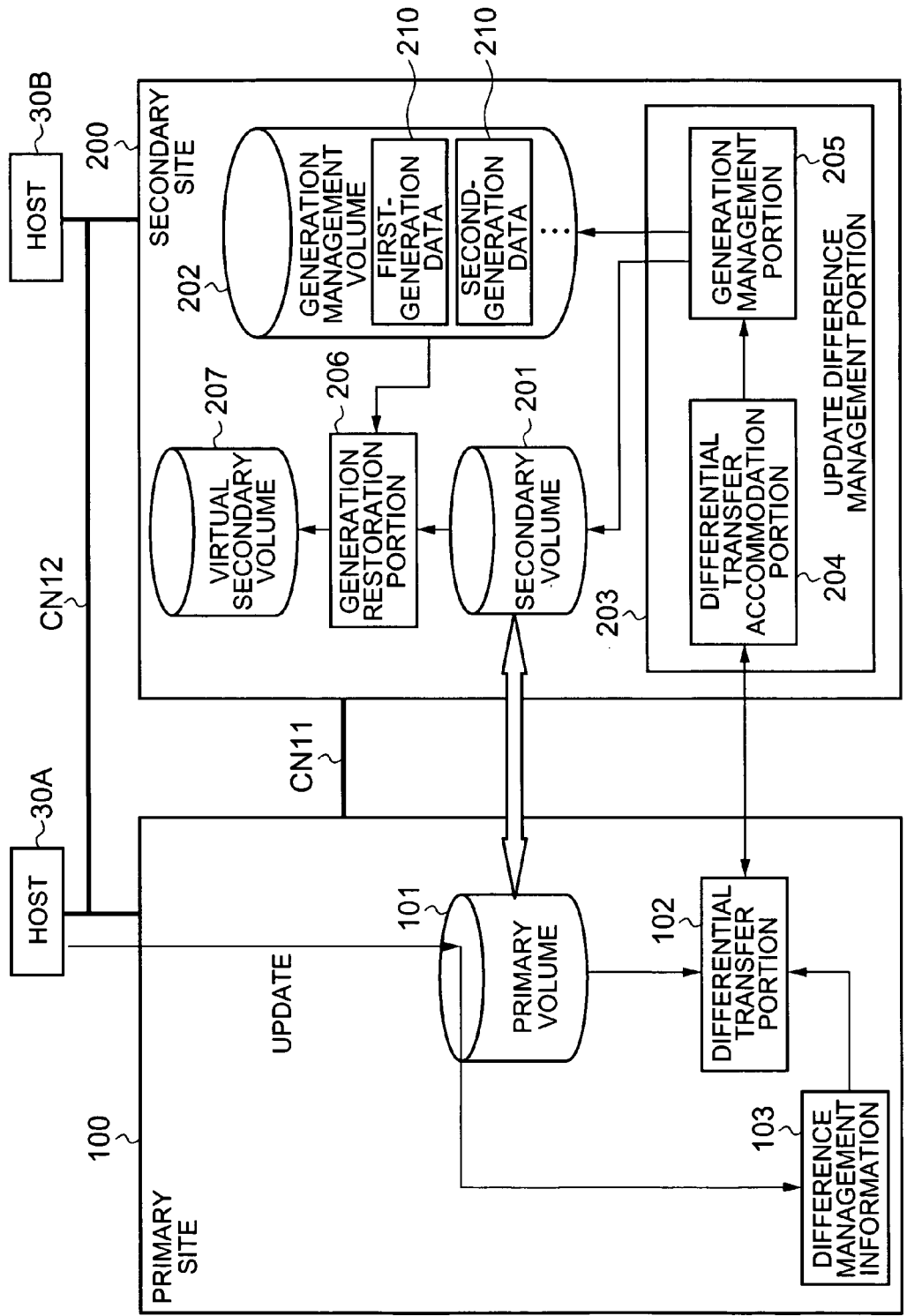
FIG. 4 is a block diagram showing the overall configuration of a storage system which performs generation management in a secondary disk array system.

FIG. 4 is a block diagram showing the principal configuration of a generation management method employing remote copy functions. The storage system comprises a primary disk array device 100 as the primary storage device provided at the primary site, and a secondary array device 200 as a secondary storage device provided at the secondary site. Both of the disk array devices 100 and 200 can be configured as described above using FIG. 2 and FIG. 3.

A SAN or other communication network CN11 connects the disk array devices 100 and 200. Also, each of the disk array devices 100, 200 and the host computers 30A, 30B are connected by a communication network CN12 such as a LAN or SAN. In this embodiment, the host computer 30A is taken to be the primary host, and the host computer 30B is taken to be the secondary host. The primary host 30A accesses the primary disk array device 100. The secondary host 30B accesses the secondary disk array device 200. When there is no need to distinguish between the primary host 30A and the secondary host 30B, both are simply called hosts 30.

The primary disk array device 100 comprises a primary volume 101 and a differential transfer portion 102. The primary volume 101 is the main volume storing data groups used by the primary host 30A.

The differential transfer portion 102 realizes remote copy functions. The differential transfer portion 102 is for example, in terms of the example shown in FIG. 3, realized by execution of a program for remote copying by a processor comprised by a CHA 21.

The differential transfer portion 102 creates difference management information 103 each time an update request is sent from the primary host 30A to the primary volume 101. As shown in FIG. 5, the difference management information 103 is for example created upon each update request from the host 30A (indicated by "I/O" in the drawing), associating an update position in the primary volume 101 (the address of the leading block being updated), an update size (the number of blocks updated), and an update date and time; and this difference management information 103 is accumulated. The differential transfer portion 102 transmits to the secondary disk array device 200, with appropriate timing, the updated data (differential data) and difference management information 103 relating to the differential data. The differential data and difference management information 103 may be transmitted to the secondary disk array device 200 each time an update request is issued.

The secondary disk array device 200 comprises, for example, a secondary volume 201, a generation management volume 202, an update difference management portion 203, a generation restoration portion 206, and a virtual secondary volume 207. The update difference management portion 203 comprises a differential transfer accommodation portion 204 and a generation management portion 205.

The secondary volume 201 is a volume which forms a pair with the primary volume 101. In ordinary remote copying, the storage contents of the secondary volume 201 substantially coincide with the storage contents of the primary volume 101. In mirroring between enclosures using ordinary remote copying, first the storage contents of the primary volume 101 at a certain point in time are copied in their entirety to the secondary volume 201. This copying is called initial copying. After the completion of initial copying, differential data updated in the primary volume 101 is transmitted to the secondary volume 201, and is reflected in the storage contents of the secondary volume 201. Hence both the volumes 101 and 201 are synchronized during use. However, in this embodiment, as explained below, the storage contents of the secondary volume 201 are not synchronized with the storage contents of the primary volume 101. When the entirety of the primary disk array device 100 is compared with the entirety of the secondary disk array device 200, the storage contents of the primary volume 101 are stored in the secondary disk array device 200 as well.

As seen from the primary disk array device 100, it appears that only ordinary mirroring between enclosures is being executed through remote copying by the differential transfer portion 102. However, in this embodiment ordinary remote copying is supported, and in addition generation management, described below, is performed by the update difference management portion 203.

Figure 6:
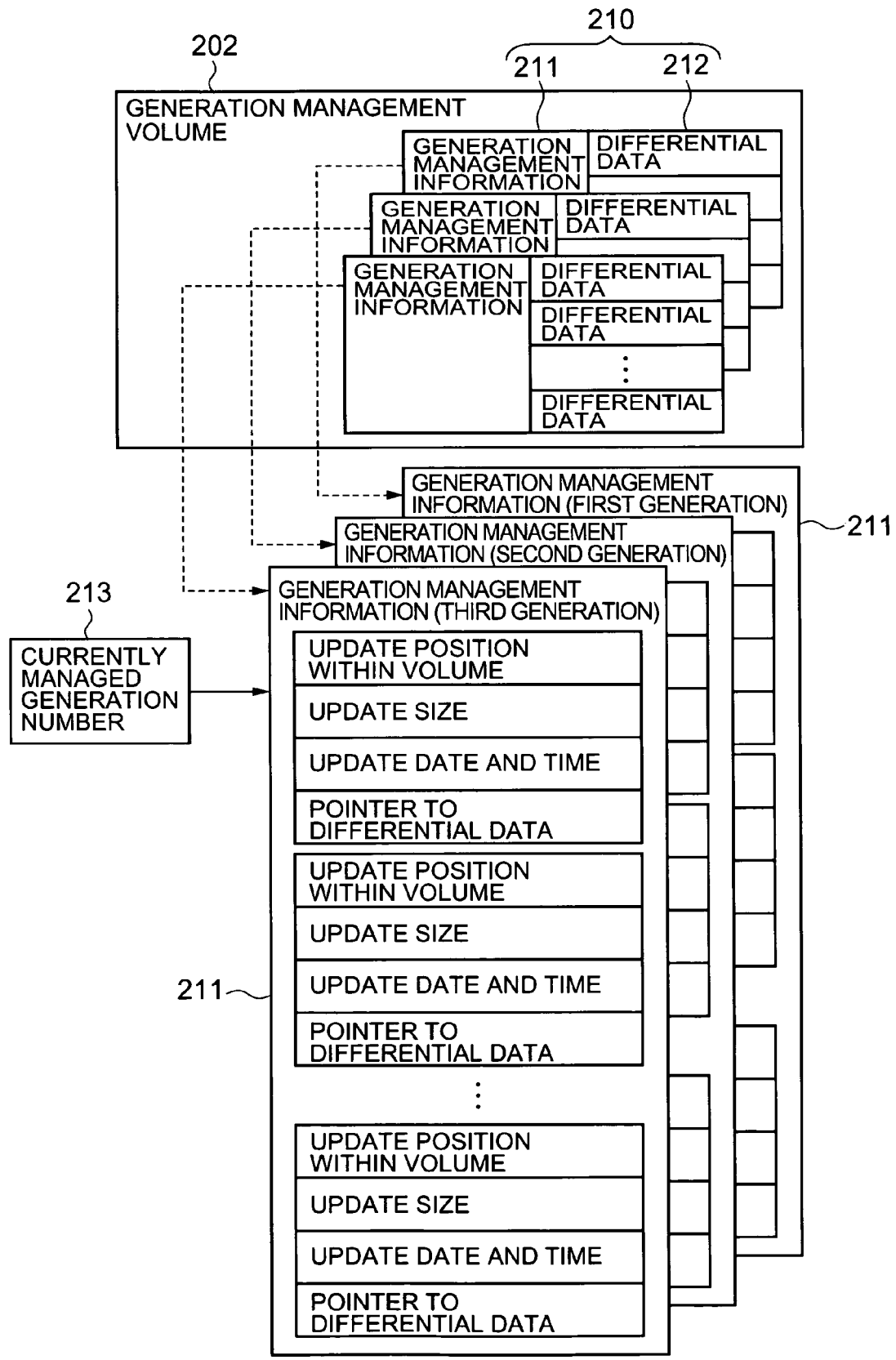
FIG. 6 is a drawing to explain details of generation management information and similar stored in a generation management volume.

Data 210 belonging to a plurality of generations is stored in the generation management volume 202, as for example a first generation data group, second generation data group, and so on. As shown in FIG. 6, generation data 210 for each generation comprises generation management information 211 and differential data 212 managed by the generation management information 211. Differential data 212 is a copy of the actual data updated in the primary volume 101.

The generation management information 211 is created for each generation, set automatically, such as for example generation management information for the first generation, generation management information for the second generation, and similar. The generation management information 211 for each generation manages the one or plurality of differential data items belonging to that generation. The generation management information 211 associates each differential data item with, for example, the update position in the volume of the differential data item, the update size, the update date and time, and a pointer indicating the storage location of the differential data item.

Here it should be noted that of the information comprised by the generation management information 211, the update position within the volume, update size, and update date and time are all comprised by the difference management information 103 shown in FIG. 5. The storage address for differential data in the generation management volume 202 is information ascertained by the secondary disk array device 200 itself. Hence the generation management information 211 and the difference management information 103 are, in essence, the same information. The generation management information 211 can in essence be created solely from the difference management information 103, and this generation management information 211 and the differential data group can be stored in the generation management volume 202. Hence in generation management on the secondary site side using remote copying, there is no need to add special functions or modify the specifications of the primary disk array device 100 of the primary site.

The currently managed generation number 213 shown in FIG. 6 is a number indicating the generation which is currently being managed. For example, if the currently managed generation number 213 is "3", then the differential data and similar received from the primary disk array device 100 is managed as data for the third generation. When generation switching conditions are met and generation switching occurs, the currently managed generation number 213 is incremented by one.

The update difference management portion 203 performs two functions. One is a function to perform processing related to remote copying with the primary disk array device 100. This function is performed by the differential transfer accommodation portion 204. The other is a function to perform data management of a plurality of generations using remote copying. This function is performed by the generation management portion 205. The update difference management portion 203 is, in terms of the example shown in FIG. 3, realized by for example the concerted operation of a CHA 21 and DKA 22. More specifically, the differential transfer accommodation portion 204 can be realized by a CHA 21. The generation management portion 205 can be realized through the concerted operation of a CHA 21 and DKA 22.

The differential transfer accommodation portion 204 receives differential data and difference management information 103 transmitted from the differential transfer portion 102 of the primary disk array device 100, and returns a response indicating reception to the differential transfer portion 102. The differential transfer accommodation portion 204 mimics the role of the other party to remote copying (the secondary disk array device). In other words, the differential transfer accommodation portion 204 functions as a virtual secondary site, appearing as a secondary site to the differential transfer portion 102 during remote copying.

The generation management portion 205 performs data management for a plurality of generations based on differential data and difference management information 103 received, via the differential transfer accommodation portion 204, from the differential transfer portion 102 of the primary disk array device 100. Specifically, the generation management portion 205 creates generation management information 211 based on difference management information 103, as described together with FIG. 6, and stores the generation management information 211 and differential data group in association for each generation in the generation management volume 202.

The generation management portion 205 stores differential data transmitted from the primary disk array device 100, demarcated by prescribed generations, while switching generations to be managed automatically based on prescribed generation switching conditions.

The generation restoration portion 206 restores the storage contents of a generation specified by, for example, the secondary host 30B or a management terminal. The generation restoration portion 206 is for example, in terms of the example shown in FIG. 3, realized mainly by a DKA 22. The generation restoration portion 206 restores the storage contents of a specified generation by reflecting the differential data for each generation stored in the generation management volume 202 at prescribed addresses, taking as a foundation the storage contents of the secondary volume 201. The restored storage contents are registered in the virtual secondary volume 207.

The virtual secondary volume 207 stores the data group for a specified generation restored by the generation restoration portion 206. The virtual secondary volume 207 has a volume size equal to or greater than that of the secondary volume 201.

Next, setting examples for various information are explained, referring to FIG. 7 and FIG. 8. First, (a) in FIG. 7 is a drawing explaining an example of the configuration information T1 of a storage system. The storage system comprises primary disk array device 100 to which the name "MCU" is assigned, and a disk array device 200 to which the name "RCU" is assigned. For each disk array device, the IP address and subnet mask, service IP address and subnet mask, logical volume storage capacity, and functions are associated. Storage system configuration information T1 can be stored for example on the hosts 30A, 30B and on a management terminal.

The "IP address and subnet mask" are addresses used by the hosts 30A, 30B to access the disk array devices 100 (MCU) and 200 (RCU). The "service IP address and subnet mask" are addresses provided so that hosts 30A, 30B can make settings for mirroring between enclosures and make settings for generation management. "Capacity" refers to the logical volume names and volume sizes comprised by the disk array devices 100, 200.

"Functions" are prerequisite functions which should be comprised by the disk array devices 100 and 200. Prerequisite functions include a differential transfer function, update difference management function, and generation restoration function. The differential transfer function must be comprised by the primary disk array device 100. The differential transfer function is realized by the differential transfer portion 102. The update difference management function is a function which should be comprised by the secondary disk array device 200. This function is realized by the update difference management portion 203. The generation restoration function is a function which should be comprised by the secondary disk array device 200. This function is realized by the generation restoration portion 206.

(b) in FIG. 7 explains an example of host configuration information T2. The host configuration information T2 is for example stored in the disk array devices 100, 200 and in a management terminal. The host configuration information T2 comprises, for example, for each host 30A and 30B, the allocated IP address and subnet mask, the administrator name when logging in with administrator rights, and the names of mounted logical volumes and mounted position, respectively in association. In the example shown in (b) of FIG. 7, both "host 1" and "host 2" indicate that a primary volume 101 is mounted on the primary disk array device 100 in each case.

(a) in FIG. 8 is an explanatory drawing showing an example of volume copy configuration information T3. Volume copy configuration information T3 can be stored in for example the disk array devices 100, 200. Volume copy configuration information T3 comprises information to identify the copy source volume in the storage system and information to identify the copy target volume in the storage system, stored in association. In the example shown, the primary volume 101 (drive 1) of the primary disk array device 100 (MCU) is set as the copy source volume, and the secondary volume 201 of the secondary disk array device 200 (RCU) is set as the copy target volume.

(b) in FIG. 8 is an explanatory drawing showing an example of generation management configuration information T4. This information T4 comprises various settings for data management of a plurality of generations within the secondary disk array device 200. Various settings may include for example "generation switching conditions", "maximum number of generations managed", "volumes for generation management", "generation management volume", and "recovery volume".

"Generation switching conditions" are conditions indicating how differential data and similar from the primary disk array device 100 is to be divided by generation. As generation switching conditions, a plurality of types of conditions can be used, such as for example time-related conditions and capacity-related conditions. A configuration may be employed in which only one among a plurality of types of conditions is used exclusively, or a configuration may be employed in which a plurality of combinations of a plurality of types of conditions are used. For example, the two conditions "switch generation daily" and "switch generations when the amount of differential data already received exceeds 40 MB" can be set. In addition to time-related conditions and capacity-related conditions, conditions stipulating generation switching when the number of times differential data or similar is received has reached a prescribed number, or when a generation switching instruction arrives from the secondary host 30B or a management terminal, can also be used. Generation switching conditions can be modified as appropriate from the host 30B or a management terminal.

"Maximum number of generations managed" is the maximum number of generations for which management is performed. In the example shown, the storage system is configured such that generation data for three generations is managed. There are differences depending on the frequency of update of the primary volume 101, but in general, the greater the number of generations managed, the greater is the capacity required for the generation management volume 202.

"Volumes for generation management" is information which identifies the volumes subjected to generation management. In this embodiment, the secondary volume 201 of the secondary disk array device 200 is subjected to generation management.

"Generation management volume" is information identifying a volume used to store generation data 210. In this embodiment, this information denotes "the drive 3 comprised by the RCU", that is, the generation management volume 202. As shown in FIG. 6, differential data 212 updated in each block of the primary volume 101, and generation management information 211 managing groups of differential data 212, are stored in the generation management volume 202. Hence as a rough estimate, the generation management volume 202 is required to have volume size equal to or greater than the volume size of the primary volume 101 plus the volume size necessary for storage of generation management information 211.

"Recovery volume" is information identifying a volume used for restoration of the storage contents for a specified generation. In this embodiment, "the drive 4 comprised by the RCU", that is, the virtual secondary volume 207, is a "recovery volume".

Figure 9:
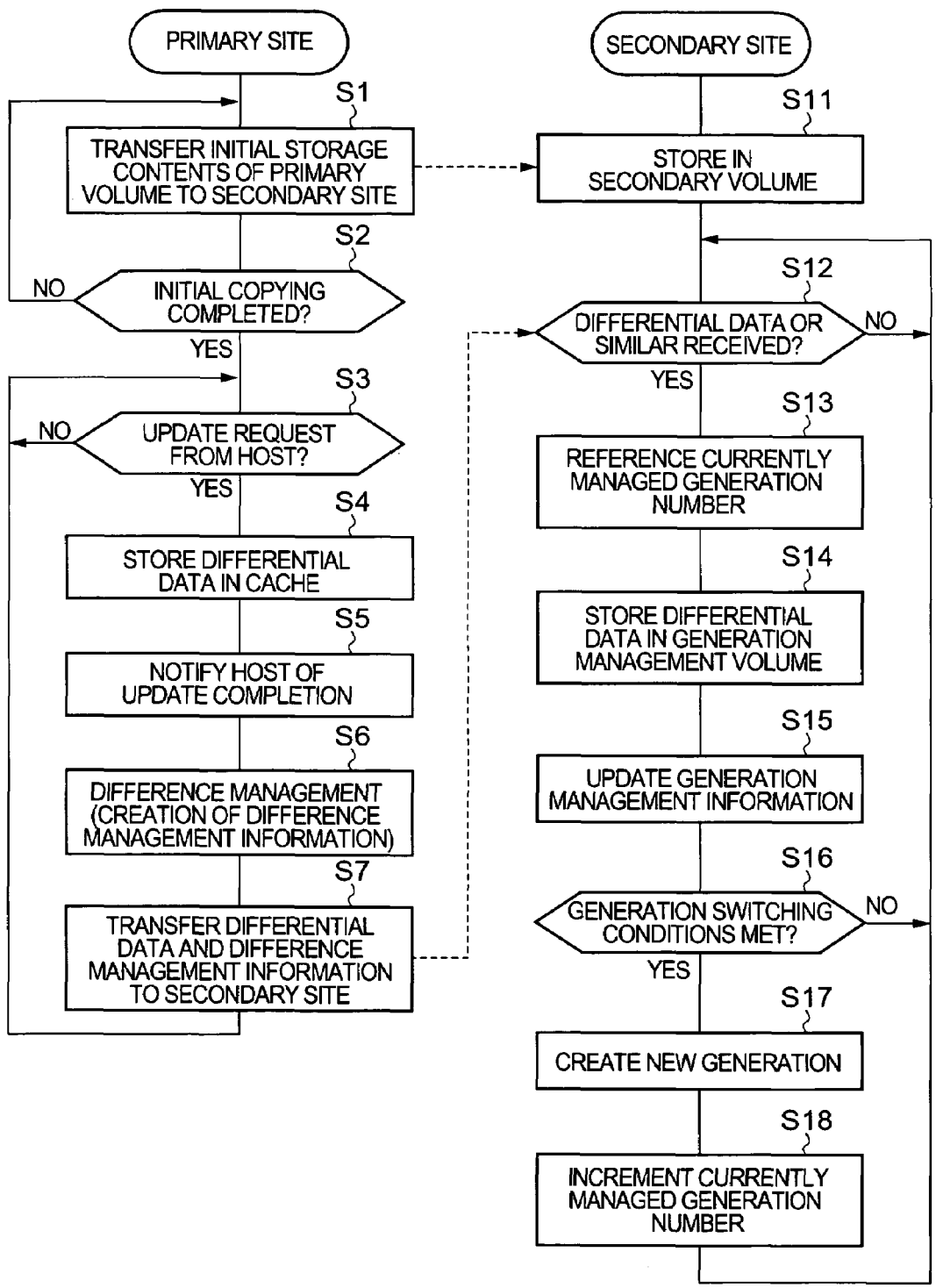
FIG. 9 is a flowchart showing in summary the processing to perform generation management.

The method of generation management in the secondary disk array device 200 is explained, referring to the flowchart of FIG. 9. In FIG. 9, the left-hand side shows in summary the processing executed in the primary disk array device 100, and the right-hand side shows in summary the processing executed by the secondary disk array device 200. In the figure, the primary disk array device 100 and secondary disk array device 200 are referred to as the primary site and as the secondary site respectively.

In the primary disk array device 100, processing is executed for mirroring between enclosures using remote copying. First, the primary disk array device 100 transfers to the secondary disk array device 200 the current storage contents of the primary volume 101. In order to begin mirroring between enclosures, volume copying is executed for the first time. The secondary disk array device 200 stores in the secondary volume 201 the data received from the primary disk array device 100 (S11). Data continues to be transmitted from the primary disk array device 100 to the secondary disk array device 200 until the completion of volume copying (initial copying) (S2).

When initial copying is completed ("YES" in S2), the primary disk array device 100 performs monitoring to determine whether data update has been requested by the host 30, that is, whether a write command has been received (S3). When there is an update request from the host 30 ("YES" in S3), the primary disk array device 100 stores the newly written data (differential data) in cache memory (S4), and reports the completion of the update to the host 30 (S5).

In this embodiment, an example of asynchronous remote copying was explained. In asynchronous remote copying, at the point in time when data received from a host 30 is stored in cache memory, the host 30 is notified of update completion. Thereafter, differential data is remote-copied from the primary disk array device 100 to the secondary disk array device 200 with appropriate timing.

In the case of synchronous remote copying on the other hand, data received from a host 30 is cached, and then the data is immediately transferred to the secondary disk array device 200. The secondary disk array device 200 stores data from the primary disk array device 100 in cache memory, after which the primary disk array device 100 is notified of update completion. The primary disk array device 100, after confirming a response from the secondary disk array device 200, reports the completion of updating to the host 30.

In synchronous remote copying, a delay occurs to the extent that waiting for a response from the secondary disk array device 200 occurs. Hence due to problems with response delay and propagation delay, synchronous remote copying is often used in cases in which the disk array devices 100, 200 are comparatively close to each other. In asynchronous remote copying, the host 30 can be promptly notified of update completion regardless of the distance between the disk array devices 100 and 200. Hence asynchronous remote copying is often used in cases in which the disk array devices 100 and 200 are comparatively distant from each other. In this embodiment, an example is given for the case of asynchronous remote copying; but synchronous remote copying may be used as well.

Returning to FIG. 9, the primary disk array device 100, upon notifying the host 30 of update completion, performs difference management (S6). In this difference management, difference management information 103 as shown in FIG. 5 is created, based on update requests (I/O) from the host 30. The newly created difference management information 103 is stored in the memory or on disks in the disk array device 100. And, upon occurrence of the appropriate timing, the primary disk array device 100 transfers the differential data and difference management information 103, in association, to the secondary disk array device 200 (S7).

The secondary disk array device 200, upon receiving differential data from the primary disk array device 100 ("YES" in S12), references the currently managed generation number 213 (S13). The secondary disk array device 200 handles the differential data receives in S12 as data for the generation indicated by the currently managed generation number 213. In the initial state, the currently managed generation number 213 is set to "1", and so the data is handled as first-generation data.

The secondary disk array device 200 stores differential data in the generation management volume 202 (S14). The secondary disk array device 200 also updates the generation management information 211 based on the difference management information 103 received together with the differential data (S15). By this means, the differential data received in S12 is associated with the generation management information 211 in the generation management volume 202, and is stored as first-generation data.

The secondary disk array device 200 repeats the processing of the above-described S12 to S15 during the period until the generation switching conditions, set in advance, are satisfied. Within this period, differential data which is remote-copied from the primary disk array device 100 is accumulated in the generation management volume 202 as first-generation data.

When for example the amount of differential data received reaches a prescribed amount, that is, when the amount of first-generation data reaches a prescribed amount, so that a generation switching condition is met ("YES" in S16), the secondary disk array device 200 makes a transition to a new generation (S17). The secondary disk array device 200 increases by one the currently managed generation number 213 (S18). In this way, differential data which is remote-copied from the primary disk array device 100 is demarcated and managed as data for different generations by the secondary disk array device 200.

Figure 10:
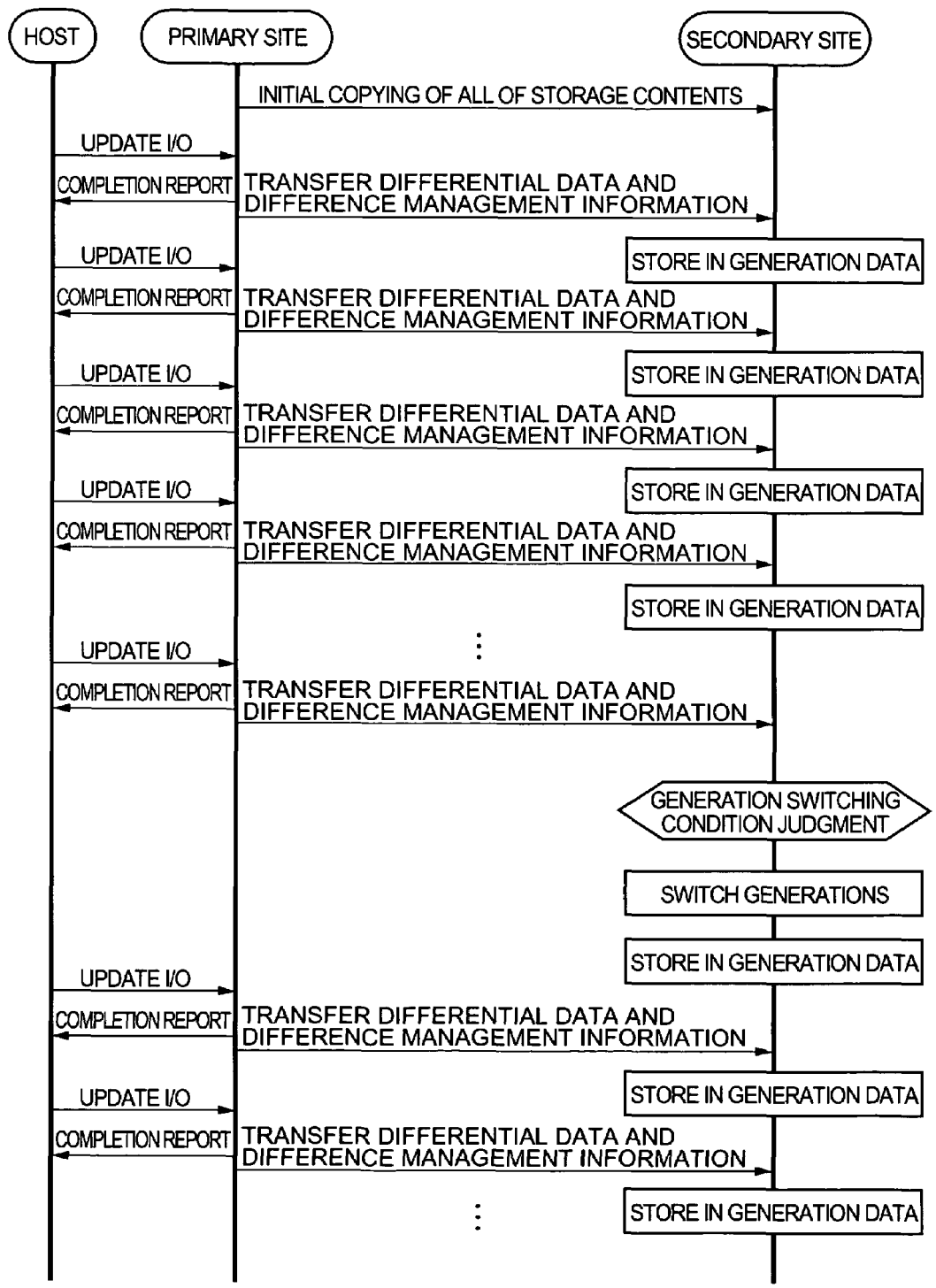
FIG. 10 is a sequence diagram illustrating management in which remote-copied differential data is delimited for each generation.

FIG. 10 is a sequence diagram summarizing operation of the host 30 and the disk array devices 100, 200. As explained above, initially the entirety of the primary volume 101 is initial-copied to the secondary volume 201.

After initial copying, when there is a data write (update) request from a host 30, the primary disk array device 100 stores this data in cache memory, and then notifies the host 30 of update completion.

Due to data updates by the host 30, differences arise between the primary volume 101 and the secondary volume 201. Hence the primary disk array device 100 transmits the differential data and difference management information 103 to the secondary disk array device 200. FIG. 10 indicates that each time there is an update from a host 30, remote copying is performed; but in actuality a plurality of updates are remote-copied at one time. However, a configuration may be employed in which remote copying is performed for each update.

The secondary disk array device 200 accumulates differential data and similar transferred from the primary disk array device 100 in the generation management volume 202 as generation data. This processing is repeated, and when the amount of generation data accumulated (the amount of differential data received) reaches a prescribed amount, or when a specified amount of time has elapsed, a generation switching condition is met.

The secondary disk array device 200 then switches the generation being managed, and continues to receive and process remote-copied data from the primary disk array device 100.

In this way, from the side of the primary disk array device 100, it appears that the secondary disk array device 200 is performing ordinary remote copy processing. However, within the secondary disk array device 200, generation management utilizing remote copying is being executed. The manner of division among generations and the current generation number within the secondary disk array device 200 cannot be determined by the primary disk array device 100. Information relating to generation management can be referenced and modified by a host 30 by accessing the secondary disk array device 200.

Figure 11:
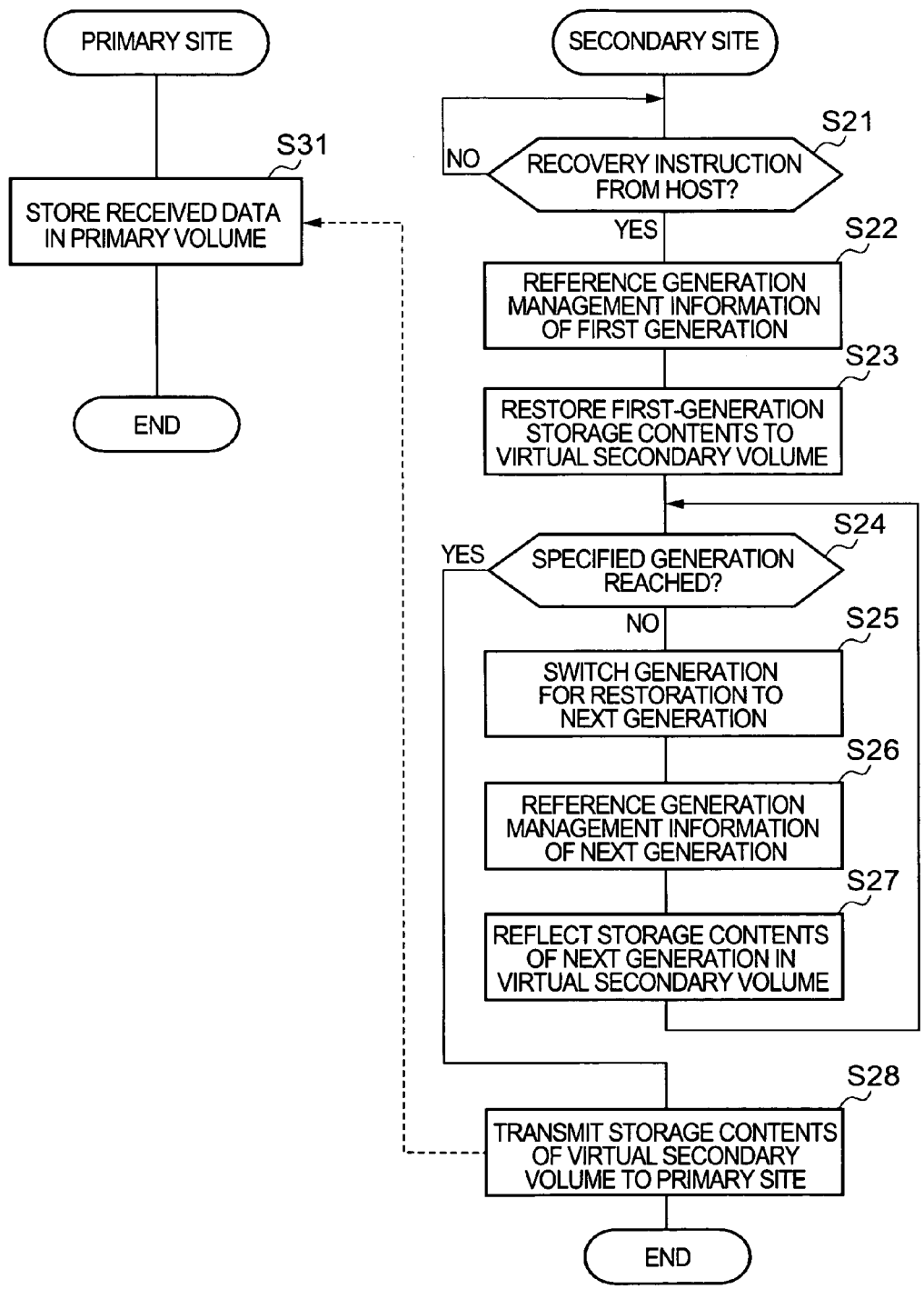
FIG. 11 is a flowchart showing in summary the processing to restore a primary volume to the storage contents of a specified generation.

Next, the flowchart of FIG. 11 indicates processing to restore the storage contents of a specified generation. A host 30 accesses the secondary disk array device 200 and specifies the number of the generation to be restored. The secondary disk array device 200, upon being instructed by a host 30 to recover a specified generation ("YES" in S21), references the generation management information 211 for the first generation (S22).

First, the secondary disk array device 200 restores the differential data 212 classified as first-generation data to a virtual secondary volume 207 (S23). The secondary disk array device 200 judges whether the storage contents for the generation specified by the host 30 have been attained (S24).

If the storage contents for the specified generation have not been restored ("NO" in S24), the secondary disk array device 200 switches the generation for restoration processing to the next generation (S25). The secondary disk array device 200 then references the generation management information 211 for the next generation (S26), and reflects differential data belonging to this generation in the virtual secondary volume 207 (S27). The processing of S25 to S27 is repeated until the specified generation is reached.

When for example there is an instruction from the host 30B to recover data up to the third generation, first the differential data group for the first generation is written to the virtual secondary volume 207. Then, the differential data group belonging to the second generation is written to the virtual secondary volume 207. Finally, the differential data group demarcated as the third generation is written to the virtual secondary volume 207. By this means, the storage contents of the third generation are realized in the virtual secondary volume 207.

When the storage contents for the specified generation have been restored ("YES" in S24), the secondary disk array device 200 transfers the storage contents of the virtual secondary volume 207 to the primary disk array device 100 (S28).

The primary disk array device 100 stores data received from the secondary disk array device 200 in the primary volume 101 (S31). By this means, the data group for a generation specified by a host 30 is stored in the primary volume 101.

This embodiment is configured as described above, and so has the following advantageous results. In this embodiment, data management for a plurality of generations can be performed on the side of the secondary disk array device 200. Hence even when the primary disk array device 100 does not comprise functions for generation management, data management for a plurality of generations can be performed by the secondary disk array device 200, so that convenience is enhanced. Further, when a primary disk array device 100 comprises functions for data management of a plurality of generations, generation management can be performed in each of the disk array devices 100 and 200. Hence in this case disaster recovery performance is improved.

In this embodiment, the remote copy functions comprised by the primary disk array device 100 are used to perform generation management at the secondary disk array device 200. Hence the primary disk array device 100 need only have remote copy functions, and in implementing this embodiment, there is no need to add functions to or alter the specifications of the primary disk array device 100. It is sufficient to additionally install an update difference management portion 203 and similar in the secondary disk array device 200 alone. Consequently generation management functions can be added to a secondary disk array device 200 without interrupting the operation of the primary disk array device 100. Hence it is possible to add, in a so-called retrofit installation, functions for generation management to a storage system which does not comprise generation management functions.

In this embodiment, in order to restore the storage contents of a specified generation, a configuration was employed comprising a virtual secondary volume separate from the secondary volume. Hence although depending on the volume size of the generation management volume 202 and other parameters, the storage contents of an arbitrary generation can be reproduced repeatedly any number of times.

In this embodiment, remote-copied difference management information 103 is utilized to create generation management information 211. Hence there is no need to acquire other special information, and generation management can be performed with a comparatively simple configuration.

In this embodiment, a configuration is employed in which the generation in which differential data is managed is set automatically based on generation switching conditions which are set in advance. Hence differential data groups can be demarcated according to appropriate conditions and generations can be managed without any particular instructions from the user.

In this embodiment, a configuration is employed in which virtual secondary site functions are provided for receiving remote-copied data from a primary disk array device 100 and for returning the required response (reception response, resend request, and similar). The virtual secondary site is realized by the update difference management portion 203, and more specifically, by the differential transfer accommodation portion 204 of the update difference management portion 203.

Hence remote copying can be utilized to execute other control, while appearing to the primary disk array device 100 that only ordinary remote copying is being performed. By this means, remote copy functions can be utilized without modification to add new functions to the secondary disk array device 200, without any changes to the specifications of the primary disk array device 100. In this embodiment, an example of functions for data management of a plurality of generations was described as such newly added functions.

By mounting a differential transfer accommodation portion 204 in another secondary disk array device, remote copying can be employed to perform other processing in this other secondary disk array device.

2. Second Embodiment

Figure 12:
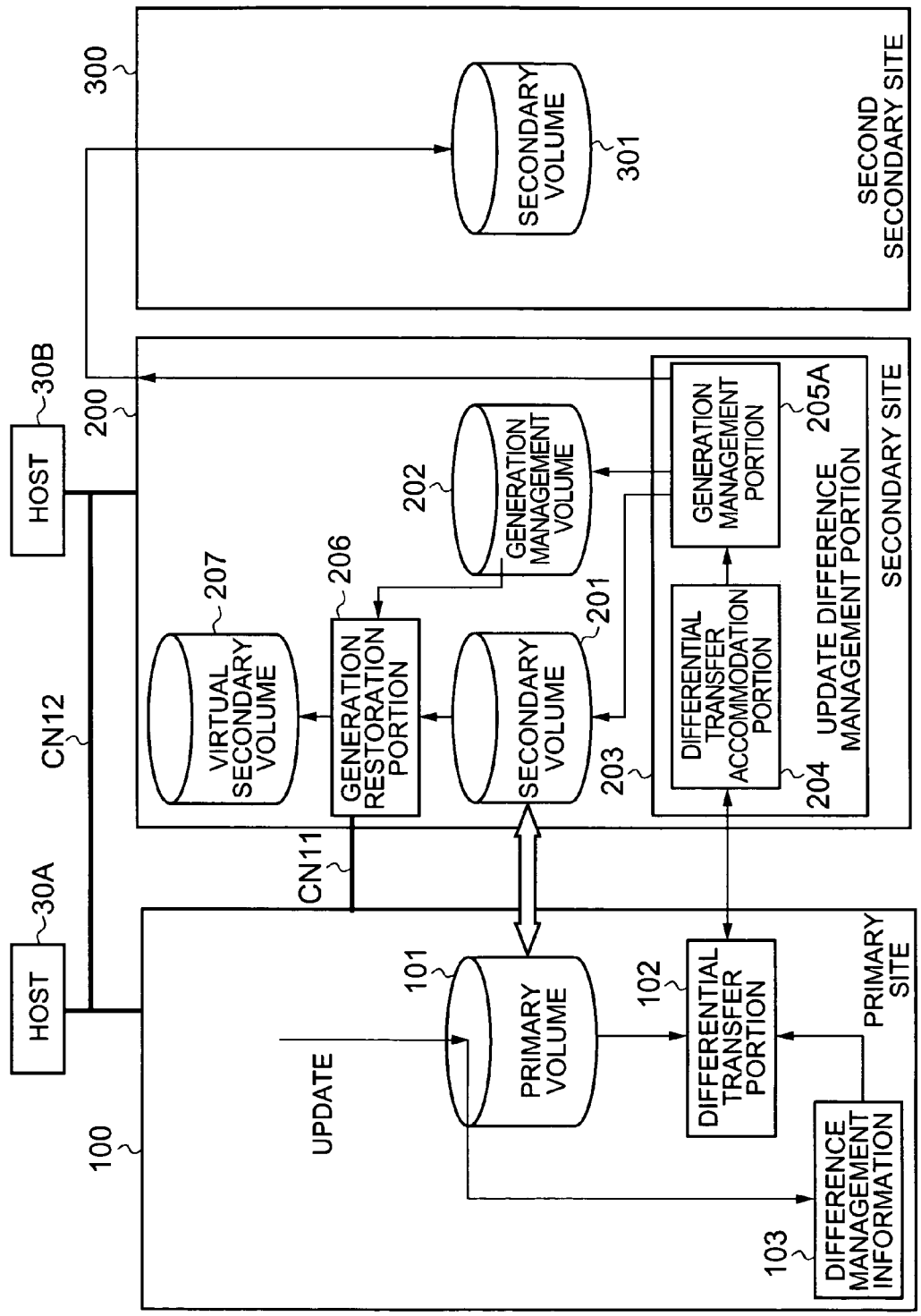
FIG. 12 is a block diagram of a storage system of a second embodiment.
Figure 13:
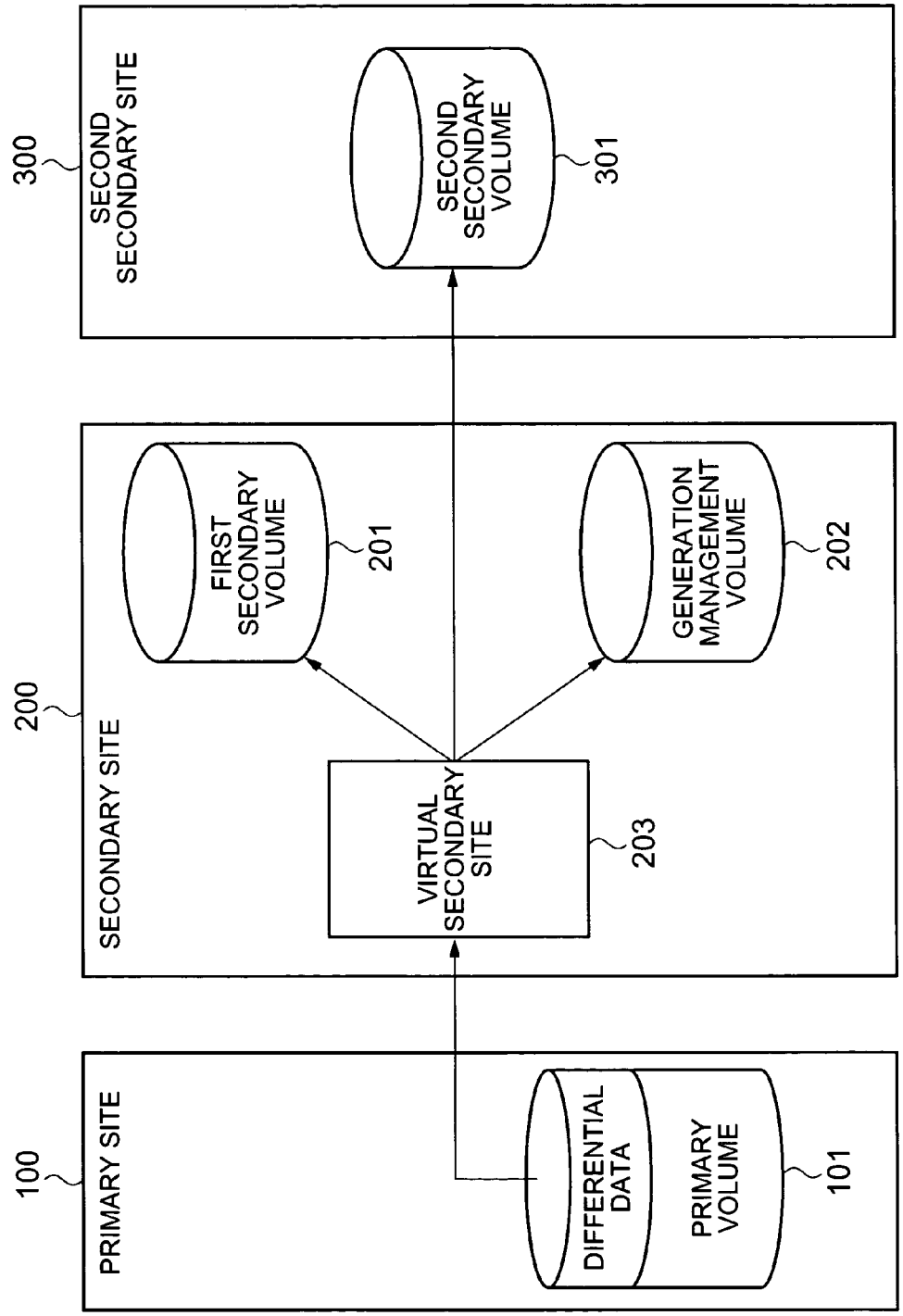
FIG. 13 is an overall conceptual diagram of the second embodiment.

A second embodiment is explained, based on FIG. 12 and FIG. 13. This embodiment is equivalent to a modified example of the first embodiment. Features of this embodiment include the use of a plurality of secondary volumes, and the use of an external volume as a secondary volume.

FIG. 12 is a summary block diagram showing the overall configuration of a storage system. The generation management portion 205A of the secondary disk array device 200 uses two types of volumes as secondary volumes. One volume is a secondary volume 201 provided within the secondary disk array device 200 (also called an internal volume or a first secondary volume). The other volume is a secondary volume 301 in an external disk array device 300 (a "second secondary site" in the figure) formed separately from the secondary disk array device 200 (also called an external volume or a second secondary volume).

As an external disk array device 300, for example, an old-type disk array device supplied by the same vendor supplying the disk array devices 100, 200, or a disk array device supplied by a vendor different from the vendor of the disk array devices 100, 200 can be used. Or, a disk array device of the same model as the secondary disk array device 200 can be used as an external disk array device 300.

Various methods can be adopted to connect an external volume 301 to the secondary disk array device 200. For example, by directly allocating the external volume 301 to an LUN (Logical Unit Number) within the secondary disk array device 200, the external volume 301 can be connected to the secondary disk array device 200. Or, a configuration can be used in which the external volume 301 is allocated to a logical volume within the secondary disk array device 200.

FIG. 13 is a conceptual diagram of this embodiment. Within the secondary disk array device 200, virtual secondary site functions are realized by the update difference management portion 203. This virtual secondary site is connected to the first secondary volume 201 existing within the secondary disk array device 200, to the second secondary volume 301 existing within the external disk array device 300, and to the generation management volume 202 existing within the secondary disk array device 200.

The secondary volumes 201 and 301 can be used in various modes, such as the following.

(1) Cases in Which the Secondary Volumes 201 and 301 Store Different Data

For example, the storage contents of the primary volume 101 are divided into two at a prescribed address, with one half of the storage contents stored in the first secondary volume 201, and the other half of the storage contents stored in the second secondary volume 301.

That is, the two volumes 201, 301 constitute a single secondary volume corresponding to the primary volume 101. As a result, even in cases where the storage capacity of the secondary disk array device is small, the external volume 301 can be used to realize data management for a plurality of generations.

A configuration is also conceivable in which the external volume 301 is used as the generation management volume 202. But in this case, each time remote-copied data is received from the primary disk array device 100, the secondary disk array device 200 must access the external disk array device 300 and transfer differential data and similar. Hence the load on the secondary disk array device 200 is increased, and responsiveness is degraded.

On the other hand, when the external volume 301 is used as the secondary volume, accessing of the external volume 301 occurs at the time of initial copy execution and at the time of generation recovery. Hence by using the external volume 301 as the secondary volume, degradation of the performance of the secondary disk array device 200 can be prevented, while effectively utilizing external storage resources and performing data management for a plurality of generations. However, the scope of this invention also comprises configurations in which an external volume 301 is used as the generation management volume.

(2) Cases in Which the Same Data is Stored in the Secondary Volumes 201, 301

These are cases in which for example the initial storage contents of the primary volume 101 are stored in both of the volumes 201, 301. By this means, the storage contents at the time of initial copying can be stored in the separate volumes 201, 301, so that robustness with respect to faults is improved.

This invention is not limited to the above-described aspects. A practitioner of the art can make various additions and modifications within the scope of this invention.

What is claimed is:

1. A storage system, in which a primary storage device having a primary volume and a secondary storage device having a secondary volume are connected, and which is capable of synchronizing said primary volume and said secondary volume by transmitting difference-related information relating to the difference between said primary volume and said secondary volume from said primary storage device to said secondary storage device, wherein said secondary storage device comprises:

a differential transfer accommodation portion, which receives said difference-related information from said primary storage device;

a generation management portion which creates generation management information based on said difference-related information received via said difference transfer accommodation portion;

a generation management volume, which stores said created generation management information; and a generation restoration portion which restores the storage contents of a specified generation based on said secondary volume and on said generation management volume, wherein said generation management portion switches from a current generation to a new generation based on predetermined generation switching conditions which are conditions indicating how difference-related information from said primary storage device is to be divided according to generations, wherein said generation switching conditions includes at least one of time-related conditions and capacity-related conditions, and wherein said generation switching conditions can be set by a user in said secondary storage device.

2. The storage system according to claim 1 further comprising:

a virtual secondary volume holding the storage contents restored by said generation restoration portion.

3. The storage system according to claim 1, wherein said difference-related information comprises differential data and difference management information to manage the differential data, and said generation management portion creates said generation management information based on said difference management information, and stores said generation management information and said differential data in association in said generation management volume.

4. The storage system according to claim 1, wherein the storage contents of said primary volume at a prescribed point In time are stored in said secondary volume.

5. The storage system according to claim 1, wherein said secondary volume comprises a plurality of volumes, and either all of or a portion of the volumes are provided within or external to said secondary storage device.

6. A remote copy method for a storage system, in which by transmitting from a primary storage device having a primary volume to a secondary storage device having a secondary volume difference-related information relating to the difference between said primary volume and said secondary volume, said primary volume and said secondary volume are synchronized, the remote copy method comprising;

an initial copying step of transmitting the storage contents of said primary volume at a prescribed point in time from said primary storage device to said secondary storage device, and storing said storage contents in said secondary volume;

a differential copying step, after completion of said initial copying step an update of said primary volume is requested, of transmitting differential data and difference management information to said secondary storage device;

a generation management step of creating generation management information based on difference management information received from said primary storage device, and storing this generation management information in association with said differential data in a generation management volume;

a restoration step of restoring the storage contents of a specified generation based on said secondary volume and on said generation management volume; and a primary volume recovery step of transmitting said restored storage contents from said secondary storage device to said primary storage device, and updating said primary volume, wherein said generation management step includes switching from a current generation to a new generation based on predetermined generation switching conditions which are conditions indicating how differential data from said primary storage device is to be divided according to generations, wherein said generation switching conditions includes at least one of time-related conditions and capacity-related conditions, and wherein said generation switching conditions can be set by a user in said secondary storage device.

* * * * *